United States Patent
Lee et al.

(10) Patent No.: US 7,016,002 B2
(45) Date of Patent: Mar. 21, 2006

(54) IN-PLANE SWITCHING MODE LIQUID CRYSTAL DISPLAY DEVICE

(75) Inventors: Joun Ho Lee, Taegu-Kwangyokshi (KR); Dong Ho Kang, Kumi-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 67 days.

(21) Appl. No.: 09/892,476

(22) Filed: Jun. 28, 2001

(65) Prior Publication Data
US 2002/0044245 A1    Apr. 18, 2002

(30) Foreign Application Priority Data
Aug. 29, 2000 (KR) ............................... 2000-50414
May 25, 2001 (KR) ............................... 2001-28977

(51) Int. Cl.
*G02F 1/1343* (2006.01)
*H01L 29/26* (2006.01)

(52) U.S. Cl. ........................................ 349/141; 257/79
(58) Field of Classification Search ................ 349/141
See application file for complete search history.

(56) References Cited

U.S. PATENT DOCUMENTS

| | | | |
|---|---|---|---|
| 5,694,188 A * | 12/1997 | Sano et al. ................... | 349/139 |
| 5,745,207 A | 4/1998 | Asada et al. ................. | 349/141 |
| 5,905,556 A | 5/1999 | Suzuki et al. ................ | 349/141 |
| 5,946,066 A | 8/1999 | Lee et al. ..................... | 349/141 |
| 6,281,958 B1 * | 8/2001 | Nakajima ..................... | 349/141 |
| 6,341,003 B1 * | 1/2002 | Ashizawa et al. ........... | 349/141 |
| 6,545,736 B1 * | 4/2003 | Ashizawa et al. ........... | 349/141 |

FOREIGN PATENT DOCUMENTS

| | | |
|---|---|---|
| JP | 9-105908 | 4/1997 |
| JP | 9-258269 | 10/1997 |
| JP | 10-026767 | 1/1998 |
| JP | 12-019558 | 1/2000 |
| JP | 2000-19558 | 1/2000 |
| JP | 12-171816 | 6/2000 |
| JP | 12-305095 | 11/2000 |
| JP | 12-305096 | 11/2000 |
| JP | 12-305097 | 11/2000 |
| KR | 10-0257976 | 3/2000 |

* cited by examiner

*Primary Examiner*—Thanh Nguyen
(74) *Attorney, Agent, or Firm*—McKenna Long & Aldridge LLP

(57) ABSTRACT

An in-plane switching mode LCD device is disclosed, in which an overlap type between common and data electrodes is controlled by considering a distance between them so that disinclination is minimized, thereby improving picture quality. The in-plane switching mode LCD device includes first and second substrates, gate and data lines defining a pixel region on the first substrate, a plurality of common and data electrodes formed to cross one another within the pixel region at constant intervals, a common line formed in parallel with the gate line, the common electrodes being diverged from the common line, a thin film transistor formed in a crossing portion of the gate and data lines, and a liquid crystal layer formed between the first and second substrates, wherein the data electrodes are connected with the thin film transistor at one side and the data electrodes overlap the common line at a minimum area so as not to affect electric field generated between the common electrodes and the data electrodes.

12 Claims, 16 Drawing Sheets

IN-PLANE SWITCHING MODE LIQUID CRYSTAL DISPLAY DEVICE

This application claims the benefit of Korean Patent Application No. 2000-50414, filed on Aug. 29, 2000, and Korean Patent Application No. 2001-28977, filed on May 25, 2001, which are hereby incorporated by reference for all purposes as if fully set forth herein.

BACKGROUND OF THE INVENTION

1. Field of the Invention

The present invention relates to a liquid crystal display (LCD) device, and more particularly, to an in-plane switching mode (IPS) LCD device that drives a liquid crystal by horizontal electric field.

2. Discussion of the Related Art

Generally, an LCD device include two glass substrates and a liquid crystal layer sealed between them. A thin film transistor (TFT) is used as a switching element that switches a signal voltage in the liquid crystal layer.

In other words, as shown in FIG. 1, the LCD device includes a lower glass substrate 1 provided with a TFT as a switching element, an upper glass substrate 2 provided with a color filter, and a liquid crystal layer 3 injected between the two glass substrates 1 and 2. The LCD device is a non-light-emitting device that can obtain an image effect based on electro-optical characteristics of the liquid crystal layer.

Such LCD devices have low power consumption and are easy to carry. In this respect, the LCD device is receiving much attention as an advanced display device that can substitute for a cathode ray tube (CRT).

The lower glass substrate 1 includes TFT arrays 4, pixel electrodes 4a, and an alignment film 8. The upper glass substrate 2 includes light-shielding layer 5, color filter layer 6, a common electrode 7, and an alignment film 8.

The lower glass substrate 1 and the upper glass substrate 2 are bonded to each other by a sealant such as epoxy resin. A driving circuit 11 on a printed circuit board (PCB) 10 is connected with the lower glass substrate 1 through a tape carrier package (TCP) 12. The driving circuit 11 generates various control signals and signal voltages to display images.

Currently, one of the most widely used LCDs is a twisted nematic (TN) mode LCD. The TN-mode LCD is constructed in a manner that electrodes are respectively formed on two substrates, and liquid crystal molecules interposed between them are twisted in a spiral shape, parallel to the substrates and having a predetermined pitch.

In this structure, a voltage is applied to the electrodes to drive a director of liquid crystal molecules. However, the TN-mode LCD has poor contrast because light is not completely blocked in an OFF-state. Furthermore, it generates a gray inversion so that a contrast ratio varies with angles to invert luminance of medium gray, thereby causing a difficulty in obtaining stabilized images. Moreover, the TN-mode LCD does not have satisfactory viewing angle.

A variety of research has been conducted for solving the narrow viewing angle problem of the LCD. They include a film-compensated mode for compensating a viewing angle with a compensation film, a multi-domain mode in which pixels are divided into multiple domains and each domain has a different main viewing angle direction to compensate the viewing angle, and an optically compensated birefringence (OCB) mode.

Meanwhile, a vertical alignment (VA) mode LCD uses a negative liquid crystal having a negative dielectric constant anisotropy and a vertical alignment film. In this type of the LCD, the longer sides of the liquid crystal molecules are arranged perpendicular to the alignment film plane when no voltage is applied, and a polarizing axis of a polarizer attached onto the substrate is located perpendicular to the longer sides of the liquid crystal molecules, to represent normally black mode.

On the other hand, when a voltage is applied to the LCD, the longer sides of the molecules are moved from the direction perpendicular to the plane of the alignment film toward the alignment film plane to transmit the light according to the characteristic in which the negative liquid crystal molecules are oriented and inclined with respect to the electric field.

The VA-mode LCD is superior to the TN-mode LCD in terms of a contrast ratio, a response time, and so on. Furthermore, in case where a direction in which the liquid crystal molecules fall is divided into a predetermined number of multiple directions and a compensated film is employed, a viewing angle can be effectively realized.

However, various types of LCDs such as the VA mode LCD, the TN mode LCD provided with a light-compensating film, and a multi-domain LCD still have problems in that contrast ratio is deteriorated depending on the viewing angle and a color is changed.

In this respect, there has been proposed an in-plane switching mode LCD device in which two electrodes (data electrode and common electrode) are placed on one substrate to control arrangement of the liquid crystals by the electric field parallel to the substrate.

FIGS. 2A to 2C are plan views illustrating a related art in-plane switching mode LCD device.

As shown in FIG. 2A, gate lines 21 and data lines 23 are arranged in first and second directions to define a plurality of pixel regions. A plurality of common electrodes 25 and data electrodes 27 are arranged within the pixel regions to be substantially parallel with the data lines 23. In the drawing, only a unit pixel is shown.

A common line 25a is formed within each pixel region in parallel with the gate line. The common electrode 25 extends from the common line 25a. The common line 25a and the common electrode 25 form a single body.

The common and data electrodes 25 and 27 are formed of metal. The common electrode 25 and the gate line 21 are formed by the same process.

The aforementioned related art in-plane switching mode LCD device, as shown, includes overlap regions "A" to "H" where the data electrode 27 overlaps the common electrode 25 within the pixel region. Edge portions in the overlap region are at right angles to each other by design. However, the edge portions are actually formed in a round shape as shown in FIG. 2B.

As described above, in case where the edge portions in the overlap region have a round shape, in some regions among the regions "A" to "H", distortion of the electric field occurs depending on a rubbing direction.

Actually, when the rubbing direction is as indicated by arrows shown in FIG. 2B, and the data electrode 27 is located on the common electrode 25, the edge portions of the data electrode 27 are rounded in the regions "A", "C", "F", and "H". Since the rounded direction is the same as the rubbing direction, the electric field direction between the common electrode 25 and the data electrode 27 is also the same as the rubbing direction.

However, since the edge portions are rounded in a direction opposite to the rubbing direction in the regions "B", "D", "E" and "G", the electric field occurs in a direction opposite to the rubbing direction. That is, since rotation direction of the liquid crystal is inverse to the rubbing direction in the regions "B", "D", "E", and "G", disinclination occurs therein.

As shown in FIG. 2C, in case where the overlap edge portions have a round shape, the electric field depends on the rubbing direction among the regions "A" to "H".

Actually, when the rubbing direction is shown in FIG. 2C, even if the pattern in the regions "A", "C", "F", and "H" has a round shape, the round pattern has the same direction as the rubbing direction. Accordingly, the electric field between the common electrode 25 and the data electrode 27 is in the same direction as the rubbing direction. On the other hand, since the pattern in the regions "B", "D", "E", and "G" has a round shape in a direction opposite to the rubbing direction, the electric field is also formed in a direction opposite to the rubbing direction.

In other words, in the regions "B", "D", "E", and "G", a rotation direction of the liquid crystal is in a direction opposite to the rubbing direction. Accordingly, disinclination occurs therein.

Meanwhile, FIG. 3A is a sectional view taken along line I–I' of FIG. 2B, and FIG. 3B is a sectional view taken along line II–II' of FIG. 2B. As shown, the related art in-plane switching mode LCD device includes a first substrate 30, a common line 25a formed on the first substrate 30, an insulating film 32 formed on an entire surface of the first substrate 30 including the common line 25a, and a data electrode 27 formed on the insulating film 32 to partially overlap the common line 25a. In the drawings, S1 denotes an overlap area between the common 25a and the data electrode 27 and L1 denotes the distance between an edge of the common line 25a and an edge of the data electrode 27.

A light-shielding layer (not shown) and a color filter layer are formed on a second substrate (not shown) opposite to the first substrate 30. The light-shielding layer shields light from a region other than a pixel region defined in the first substrate 30. The color filter layer displays colors. A liquid crystal layer (not shown) is arranged between the first and second substrates.

In the aforementioned related art in-plane switching mode LCD device, if a driving voltage is applied from an external driving circuit, electric field parallel to the substrate occurs between the data electrode 27 and the common electrode 25. Therefore, liquid crystal molecules aligned within the liquid crystal layer are rotated along the electric field in a state that the liquid crystal molecule is parallel to the substrate. As a result, an amount of light that passes through the liquid crystal layer is controlled.

At this time, since gray scale can be obtained in a state that the liquid crystal molecules are parallel to the substrate, a difference of light transmittance due to a viewing angle is reduced.

However, the related art in-plane switching mode LCD device has several problems.

Since the edge portions of the data and common electrodes formed within the pixel region overlap each other regardless of the rubbing direction, the electric field partially occurs in a direction opposite to the rubbing direction. Disinclination occurs in the overlap region. For this reason, luminance is reduced.

SUMMARY OF THE INVENTION

Accordingly, the present invention is directed to an in-plane switching mode LCD device that substantially obviates one or more of the problems due to limitations and disadvantages of the related art.

An object of the present invention is to provide an in-plane switching mode LCD device in which an overlap type between common and data electrodes is controlled by considering a distance between them so that disinclination is minimized, thereby improving picture quality.

Additional features and advantages of the invention will be set forth in the description which follows, and in part will be apparent from the description, or may be learned by practice of the invention. The objectives and other advantages of the invention will be realized and attained by the scheme particularly pointed out in the written description and claims hereof as well as the appended drawings.

To achieve these and other advantages and in accordance with the purpose of the present invention, as embodied and broadly described, an in-plane switching mode LCD device according to the present invention includes first and second substrates, gate and data lines defining a pixel region on the first substrate, a plurality of common and data electrodes formed to cross one another within the pixel region at constant intervals, a common line formed in parallel with the gate line, the common electrodes extending from the common line, a TFT formed in a crossing portion of the gate and data lines, and a liquid crystal layer formed between the first and second substrates, wherein the data electrodes are connected with the TFT at one side and the data electrodes overlap the common line at a minimum area so as not to affect electric field generated between the common electrodes and the data electrodes.

In the preferred embodiment of the present invention, the other sides of the data electrodes overlap the common line or simultaneously overlap the common line and the gate line. The common line and the data electrode overlap each other in an edge portion such that electric field between the common line and the data electrode occurs so as not to be in inverse to a rubbing direction.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification and in which like reference numerals refer to like elements, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 4:
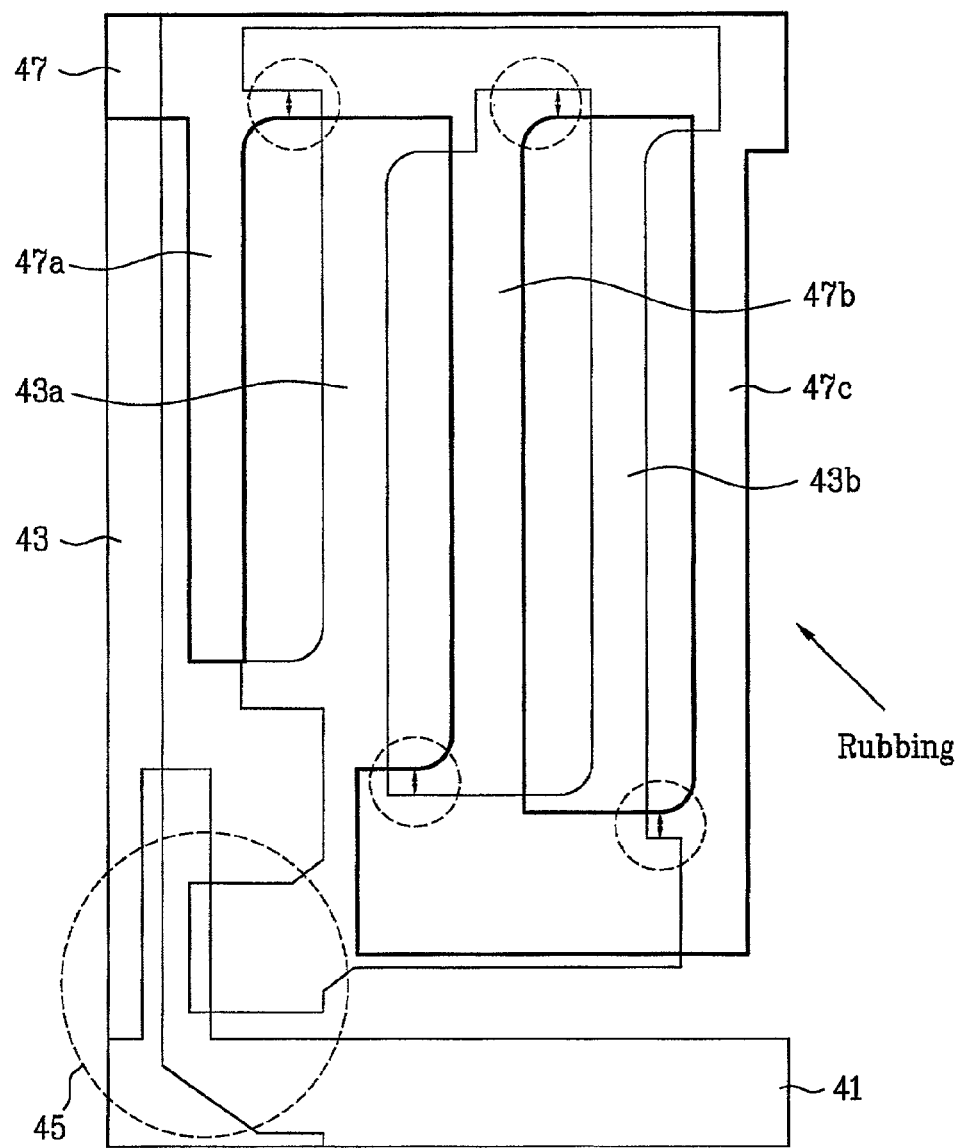
FIG. 4 is a plan view illustrating an in-plane switching mode LCD device according to the first embodiment of the present invention.

FIG. 4 is a plan view illustrating an in-plane switching mode LCD device according to the first embodiment of the present invention.

As shown in FIG. 4, the in-plane switching mode LCD device according to the first embodiment of the present invention includes gate and data lines 41 and 43 arranged to cross each other and defining a pixel region on the first substrate, a TFT 45 formed in a crossing portion of the gate and data lines 41 and 43, a plurality of first and second data electrodes 43a and 43b formed in parallel with the data line 43 within the pixel region, and a plurality of first to third common electrodes 47a, 47b, and 47c formed in parallel with the first and second data electrodes 43a and 43b.

The common first electrode 47a extends from a common line 47, which is substantially in parallel with the gate line 41, within the pixel region and is formed in parallel with the data line 43. The second common electrode 47b is formed with at least one data electrode 43a interposed between the first common electrode 47a and the second common electrode 47b in parallel with the first common electrode 47a. The second common electrode 47b extends from the common line 47. The third common electrode 47c is formed with at least one data electrode 43b interposed between the second common electrode 47b and the third common electrode 47c in parallel with the second common electrode 47b. The second common electrode 47b is formed with one end of the third common electrode 47c.

Meanwhile, the first data electrode 43a is connected with the TFT 45 and extends to the common line 47. Also, the first data electrode 43a has an end located on an inner surface portion of the common line 47. The second data electrode 43b is formed between the second common electrode 47b and the third common electrode 47c in parallel with them. One end of the first data electrode 43a is electrically connected to one end of the second data electrode 43b.

The common line 47 and the first common electrode 47a to the third common electrode 47c form a single body. The first data electrode 43a and the second data electrode 43b also form a single body.

Figure 1:
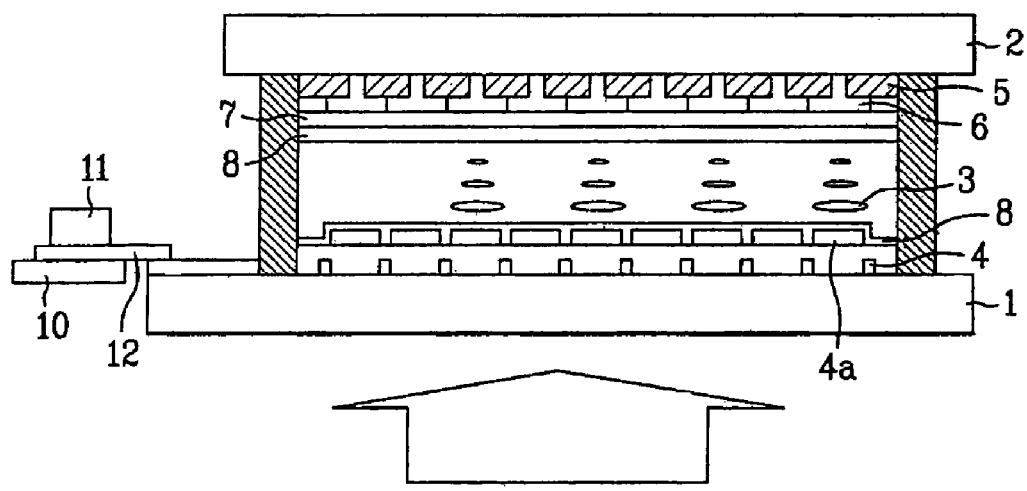
FIG. 1 is a schematic view illustrating a general LCD device.
Figure 2A:
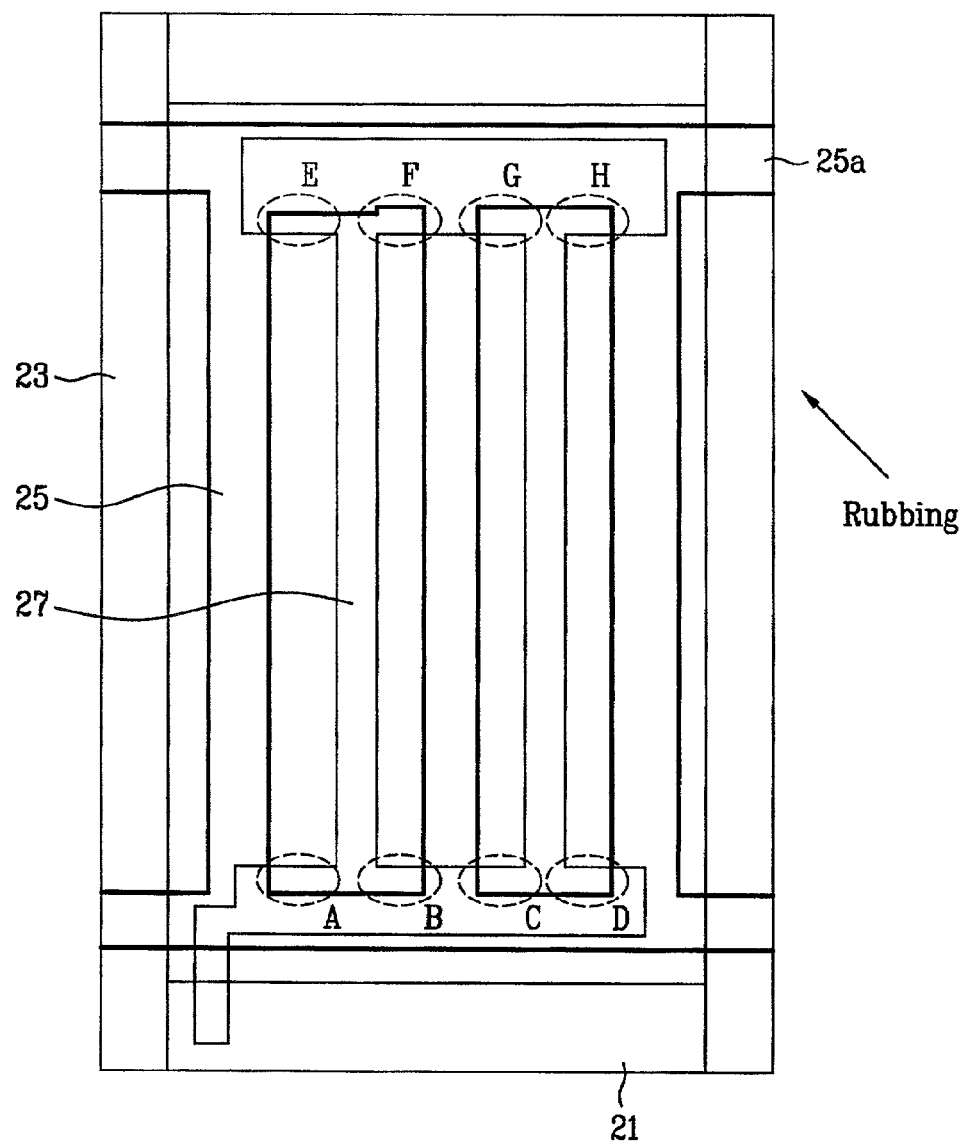
FIGS. 2A to 2C are plan views illustrating a related art in-plane switching mode LCD device.
Figure 2B:
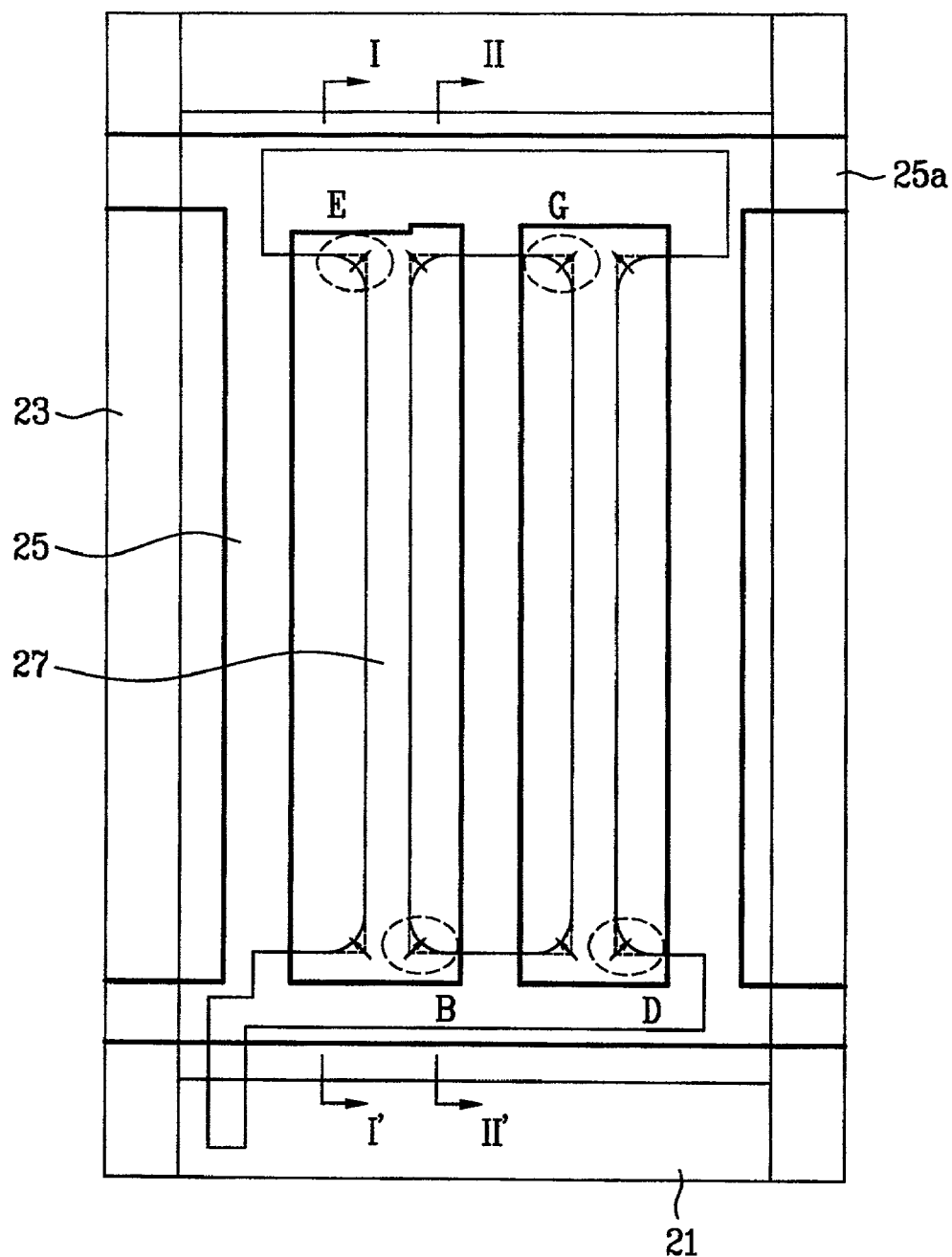
Figure 2C:
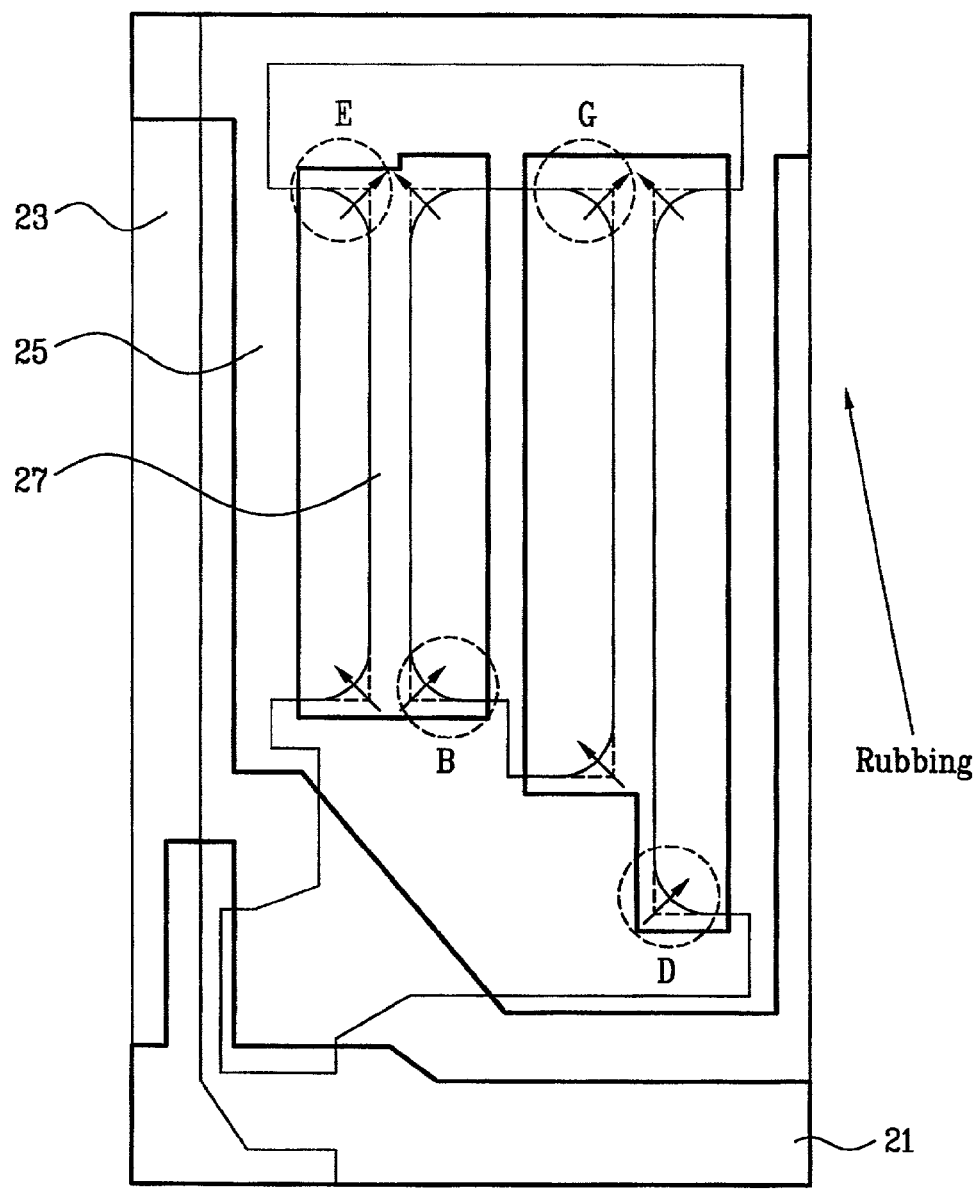

An actual pattern of the elements in the pixel region will be described. It is assumed that a rubbing direction is shown in the drawing. In this case, in the related art, an edge of an electrode outwardly located in the regions "B", "D", "E", and "G", as shown in FIG. 2, i.e., an edge of the data electrode is rounded in a direction opposite to the rubbing direction. For this reason, rotation direction of the liquid crystal is inverse to the rubbing direction, thereby causing disinclination. However, in the first embodiment of the present invention, as shown in FIG. 4, edges of the data electrodes 43a and 43b in the above regions are located on an inner surface of the common line 47 so that the edges of the electrodes located away from the common line 47 are rounded in the same direction as the rubbing direction.

Figure 5:
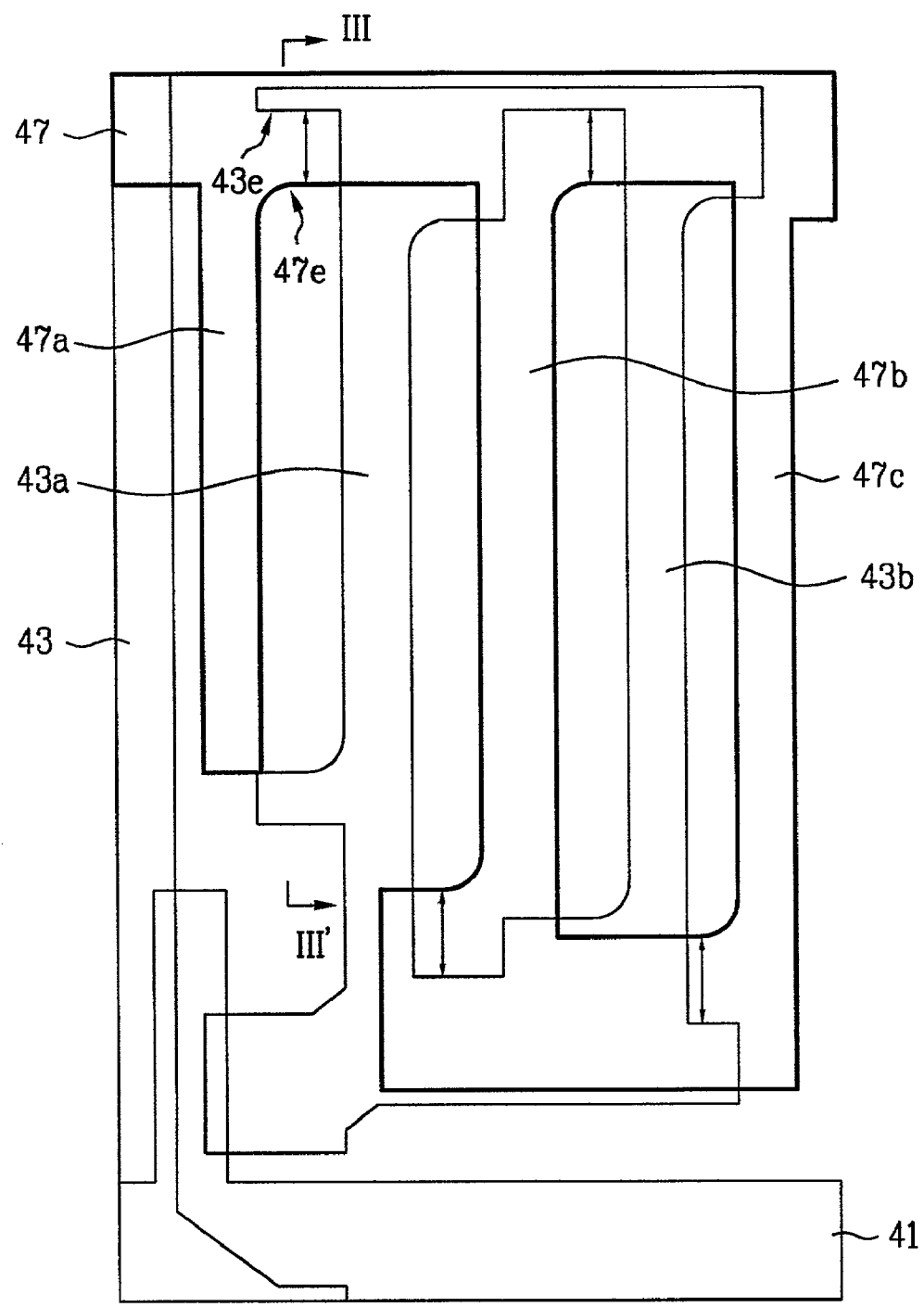
FIG. 5 is a plan view illustrating an in-plane switching mode LCD device according to the second embodiment of the present invention.

FIG. 5 is a plan view illustrating an in-plane switching mode LCD device according to the second embodiment of the present invention.

Among the common line 47 and the data electrodes 43a and 43b overlap one another; the data electrodes 43a and 43b overlap an interior surface of the common line 47 so that edges of outwardly located data electrode 43a are rounded in the same direction as the rubbing direction. The distance between an edge 47e of the common line 47 and an edge 43e of the data electrode 43a is maximized.

The above structure is preferable when the distance between the common electrode and the data electrode formed in parallel with each other within a unit pixel region is wider.

In other words, the structure of FIG. 4 is effective to remove disinclination when the distance between the data electrode and the common electrode formed within the pixel region is narrow. While the structure of FIG. 5 is effective to remove disinclination when the distance between the data electrode and the common electrode is wide.

In more detail, the electric field occurring between the common electrodes 47a, 47b and 47c and the data electrodes 43a and 43b is related to the electric field occurring between the common electrode 47 and the data electrodes 43a and 43b overlapped with one another as the distance between the common electrodes and the data electrodes is increased.

If the overlap area between the common line 47 and the data electrodes 43a and 43b affects the electric field occurring between the common electrodes 47a, 47b and 47c and the data electrodes 43a and 43b in spite of a wide distance between the common electrodes 47a, 47b and 47c and the data electrodes 43a and 43b, distortion of the electric field may slightly occur in the overlap portion. For this reason, disinclination may occur.

Accordingly, as shown in FIG. 5, the overlap area between the common line 47 and the data electrodes 43a and 43b is minimized considering the distance between the common electrodes 47a, 47b and 47c and the data electrodes 43a and 43b, so that the electric field occurring in the overlap region between the common line 47 and the data electrodes 43a and 43b does not affect the electric field between the common electrodes 47a, 47b and 47c and the data electrodes 43a and 43b formed in parallel with one another. To this end, the distance between the edge of the common line 47 in the overlap region and the edge of the data electrodes 43a and 43b located inside the common line 47 is maintained so as not to affect the electric field occurring in a central portion of the pixel region.

The structure of FIG. 5 is more effective when the distance between the common electrodes 47a, 47b and 47c and the data electrodes 43a and 43b formed in parallel with one another within the pixel region is more than 3 μm. This is because a director of liquid crystal molecules is prevented from being distorted by ensuring a sufficient distance between the edge of the common line and the edge of the data electrode in the overlap region, even though the distance between the common electrode and the data electrode is wide.

Figure 6:
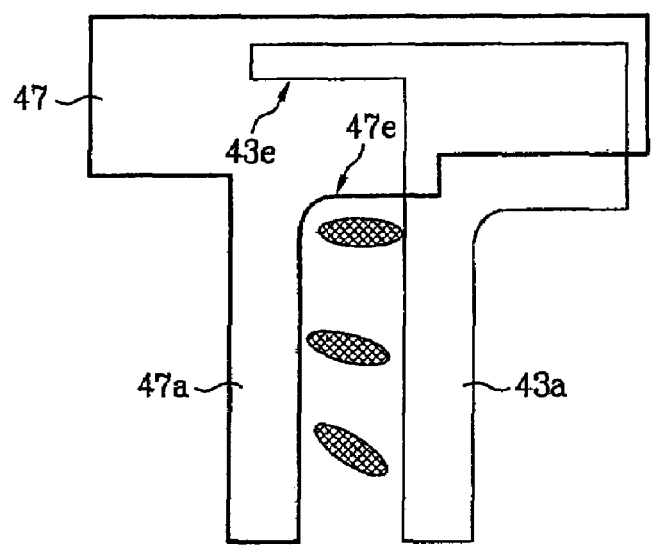
FIG. 6 shows a position of a director of liquid crystal molecules of in-plane switching mode LCD device according to the second embodiment of the present invention.

From an alignment direction of the director of the liquid crystal molecules shown in FIG. 6, it is noted that the director of the liquid crystal molecules is located between the common electrode 47a and the data electrode 43a in almost horizontal direction because the sufficient distance is maintained between the edge 47e of the common line 47 and the edge 43e of the data electrode 43a in the rounded portion, so as not to affect the electric field between the common electrode 47a and the data electrode 43a.

Figure 7:
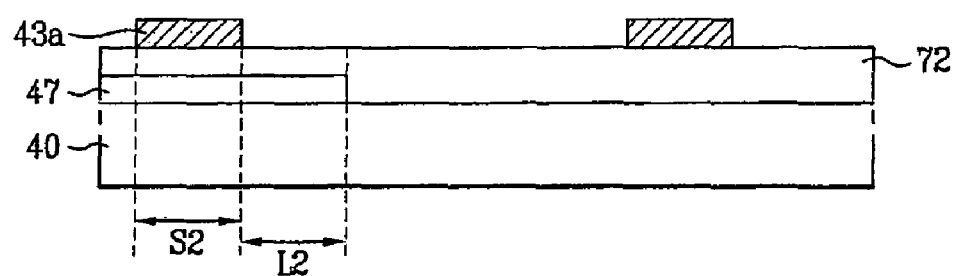
FIG. 7 is a sectional view taken along line III–III' of FIG. 5.

FIG. 7 is a sectional view taken along line III–III' of FIG. 5.

Figure 3A:
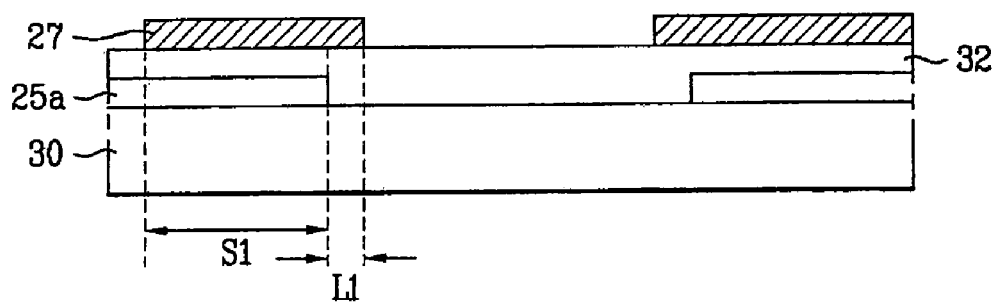
FIGS. 3A and 3B are sectional views taken along lines I–I' and II–II' of FIG. 2B.
Figure 3B:
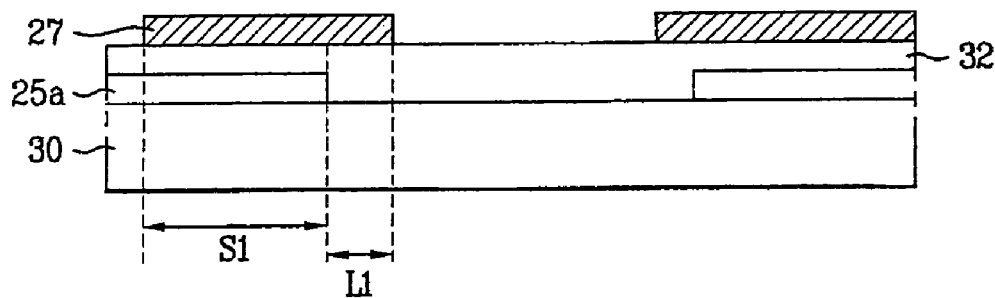

As shown in FIG. 7, the common line 47 is formed on the first substrate 40 and a data electrode 43a is formed on the common line with an insulating film 72 interposed therebetween. It is noted that the overlap area S2 between the common line 47 and the data electrode 43a is remarkably smaller than that of the related art (FIG. 3A). It is also noted that the distance L2 between the edge 47e of the common line 47 and the edge 43e of the data electrode 43a has remarkably increased as compared with the related art.

In other words, if the overlap area between the common line 47 and the data electrodes 43a and 43b is great in spite of increase of the distance between the common electrodes 47a, 47b and 47c and the data electrodes 43a and 43b, the director of the liquid crystal molecules may be more affected by the electric field between the common line 47 and the data electrodes 43a and 43b than the electric field between the common electrodes 47a, 47b and 47c and the data electrodes 43a and 43b. Therefore, in the present invention, the edge 43e of the data electrodes 43a and 43b is located inside the common line 47 so that the electric field between the common line 47 and the data electrodes 43a and 43b in the overlap region does not affect the director of the liquid crystal molecules.

Figure 8A:
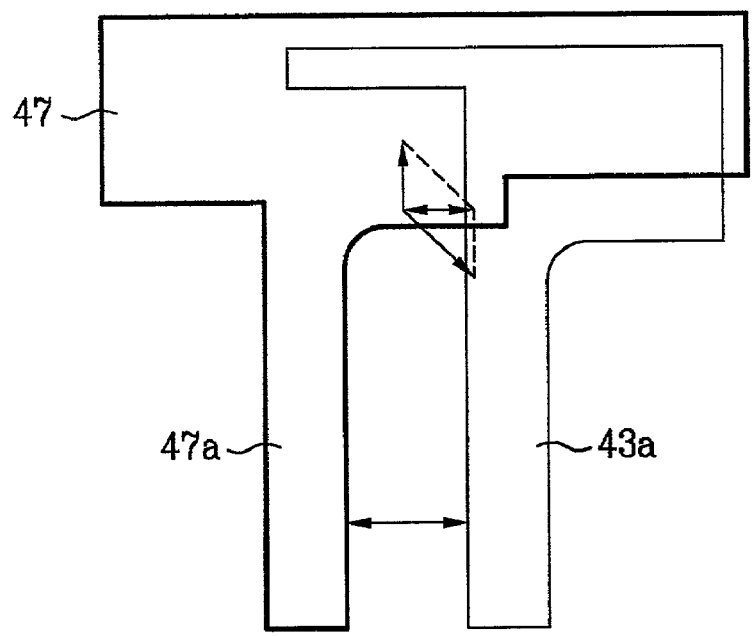
FIGS. 8A and 8B show an electric field direction of a pixel region of the in-plane switching mode LCD device according to the second embodiment of the present invention.
Figure 8B:
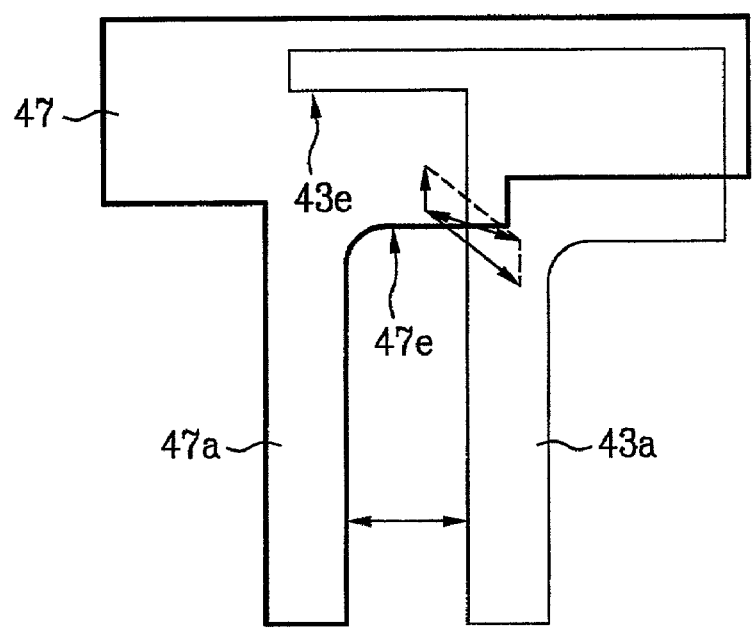

FIGS. 8A and 8B show an electric field direction of a pixel region of the in-plane switching mode LCD device according to the second embodiment of the present invention. FIG. 8A shows an electric field direction in a central portion between the common electrode 47a and the data electrode 43a. FIG. 8B shows an electric field direction in a right portion (toward the data electrode) from the central portion.

As described above, the distance between the edge 47e of the common line 47 and the edge 43e of the data electrode 43a is obtained by considering the distance between the data electrode 43a and the common electrode 47a. Accordingly, the electric field occurs toward a portion away from an absorbing axis of a polarizing plate in the rounded portion. In this case, no disinclination occurs.

Consequently, the distance between the electrodes is set such that horizontal electric field occurring in the edge portion between the common electrode and the data electrode is greater than vertical electric field, thereby removing disinclination.

In this structure, storage capacitance can be increased and the distance for formation of an upper electrode (data electrode) can be varied depending on the distance between the common electrode and the data electrode and a rounded complete pattern.

Figure 9:
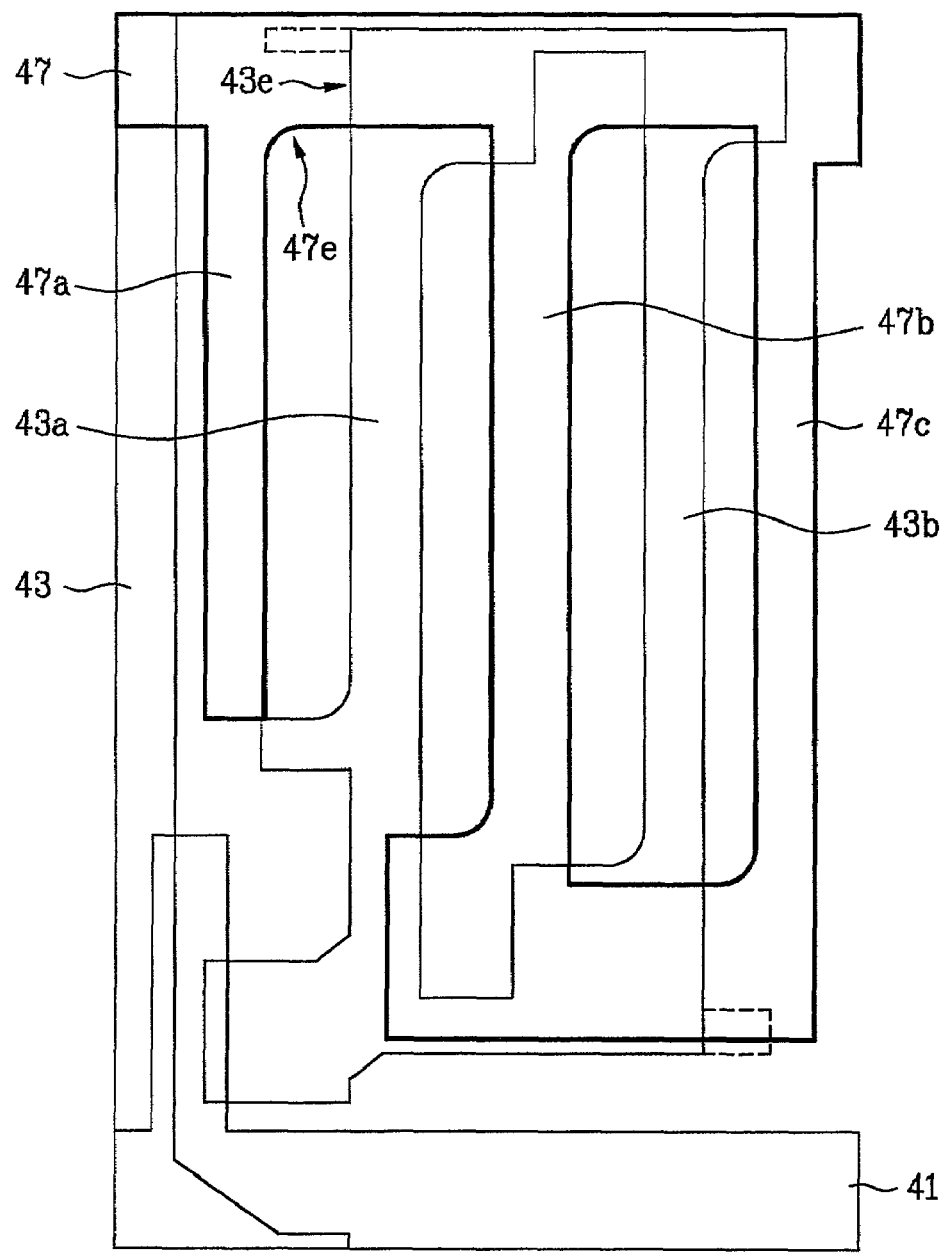
FIG. 9 is a plan view of the in-plane switching mode LCD device according to the third embodiment of the present invention.

Meanwhile, FIG. 9 is a plan view of the in-plane switching mode LCD device according to the third embodiment of the present invention.

As shown in FIG. 9, in the third embodiment of the present invention, the distance between the common electrode and the data electrode formed in parallel within a unit pixel region is wider than that of FIG. 5.

In the structure with the wide distance between the common electrode and the data electrode, the data electrode in the rounded portion is completely removed so that the electric field in the rounded portion does not affect the electric field between the common electrode and the data electrode formed in parallel within the pixel region (the removed portion of the data electrode is denoted by dotted lines).

In other words, since the distance between the common electrodes 47a, 47b and 47c and the data electrodes 43a and 43b within the pixel region is wider than that of FIG. 5, the distance between the edge 47e of the common line 47 and the edge 43e of the data electrode 43e should be increased. However, considering design margin, as shown, the data electrode 43a has been completely removed (dotted lines) in the rounded portion so as not to generate an overlap area between the common line 47 and the data electrode 43a.

In the above structure, since the electric field angle is greater than the rubbing angle, no disinclination occurs.

Figure 10A:
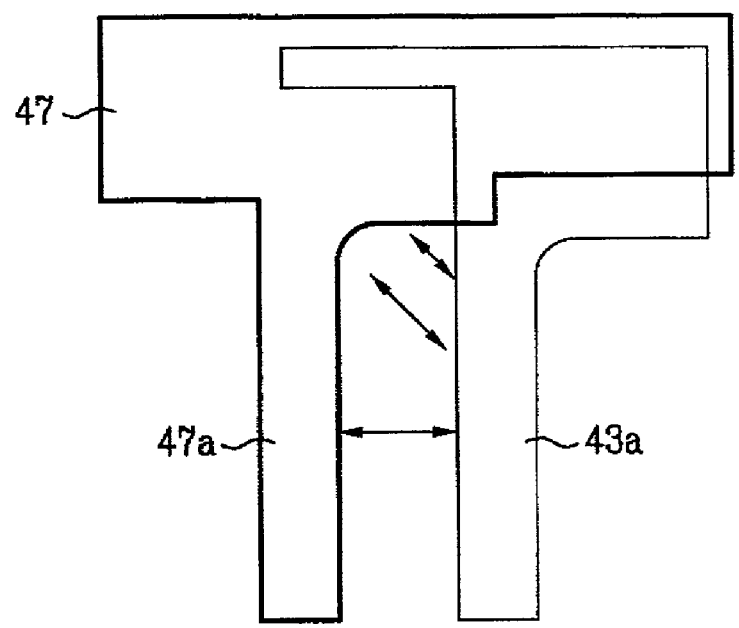
FIGS. 10A and 10B show an electric field direction of a pixel region of the in-plane switching mode LCD device according to the third embodiment of the present invention.
Figure 10B:
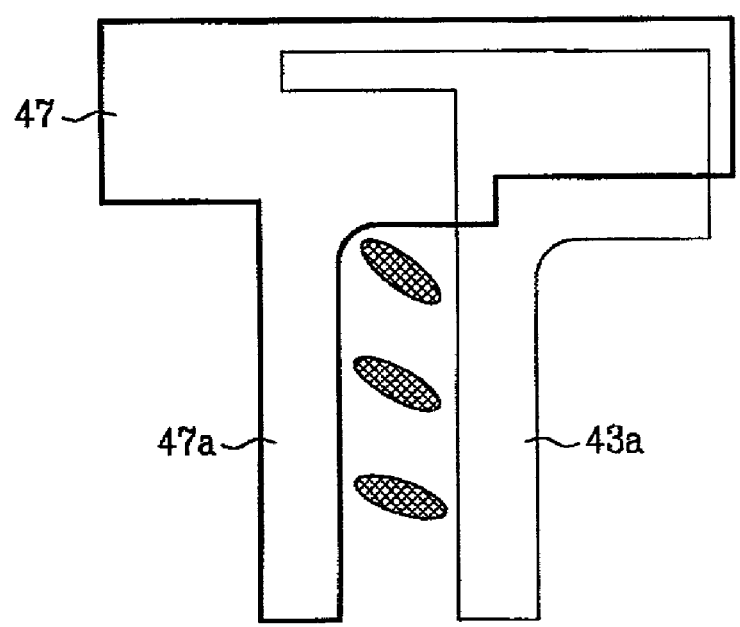

For reference, FIG. 10A shows electric field direction between the two electrodes in the structure of FIG. 9, and FIG. 10B shows alignment direction of the director of the liquid crystal molecules.

Figure 11:
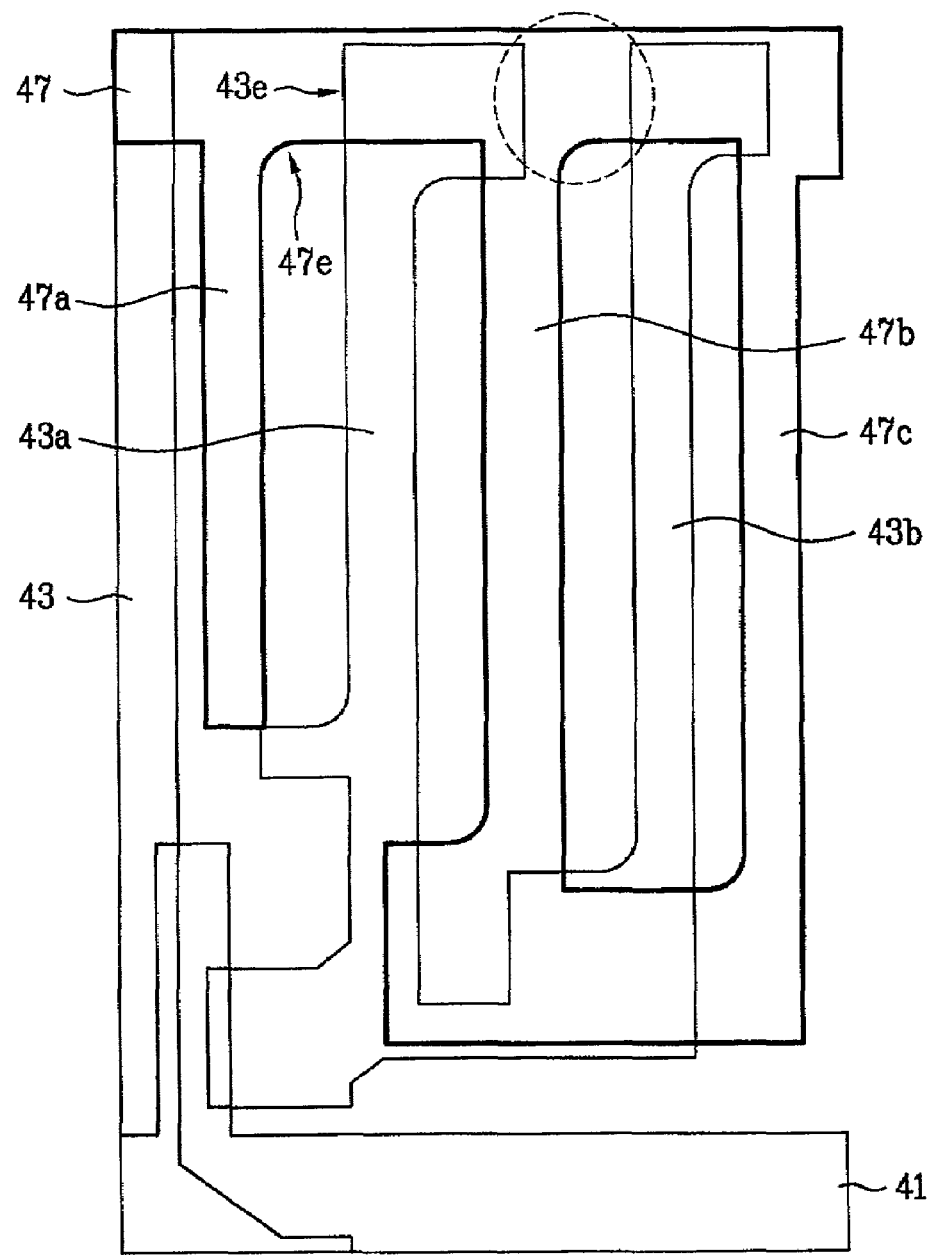
FIG. 11 is a plan view illustrating an in-plane switching mode LCD device according to the fourth embodiment of the present invention.

FIG. 11 is a plan view illustrating an in-plane switching mode LCD device according to the fourth embodiment of the present invention.

In the first to third embodiments of the present invention, the data electrodes 43a and 43b are formed at both sides of the common electrodes 47a and 47b within a unit pixel region and are connected with each other on the common line 47.

However, as shown in FIG. 11, in the fourth embodiment of the present invention, the data electrodes 43a and 43b formed at both sides of the common electrodes 47a and 47b are separated from each other on the common line 47 (see dotted lines). In that structure, since the electric field angle is more than the rubbing angle, no disinclination occurs. Also, since luminance of 50% in full white is obtained, no disinclination occurs on a screen.

Figure 12:
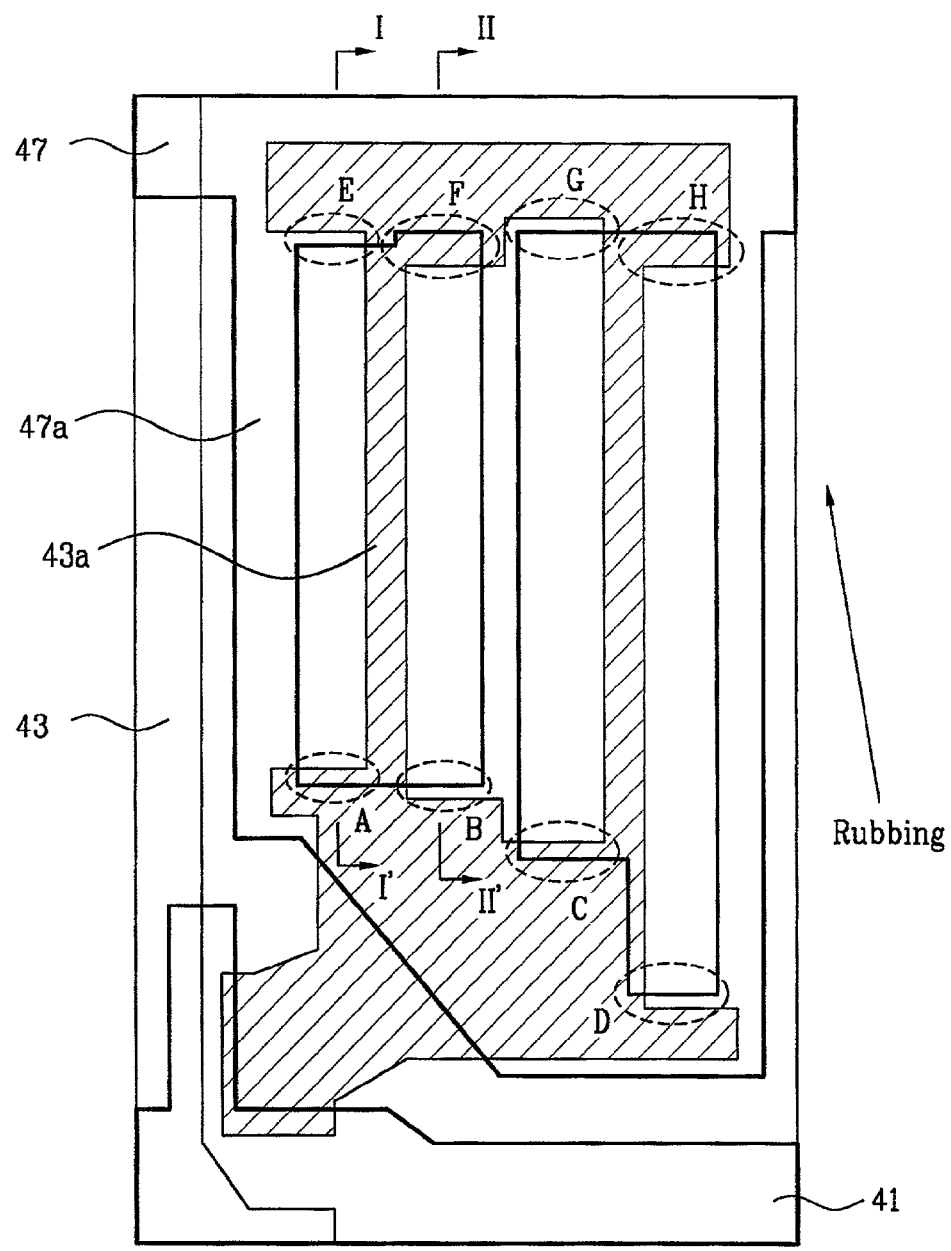
FIG. 12 is a plan view illustrating an in-plane switching mode LCD device according to the fifth embodiment of the present invention.

FIG. 12 is a plan view illustrating an in-plane switching mode LCD device according to the fifth embodiment of the present invention.

As shown in FIG. 12, when the rubbing direction is shown in FIG. 12, the edge portions of the data electrode 43a in the regions "B", "D", "E" and "G", where the electric field is formed in a direction opposite to the related art rubbing direction, are located inside the common line 47. The edge portions of the data electrode 43a in the regions "A", "C", "F", and "H", where the electric field is formed in the same direction as the rubbing direction, are located outside the common line 47.

Figure 13:
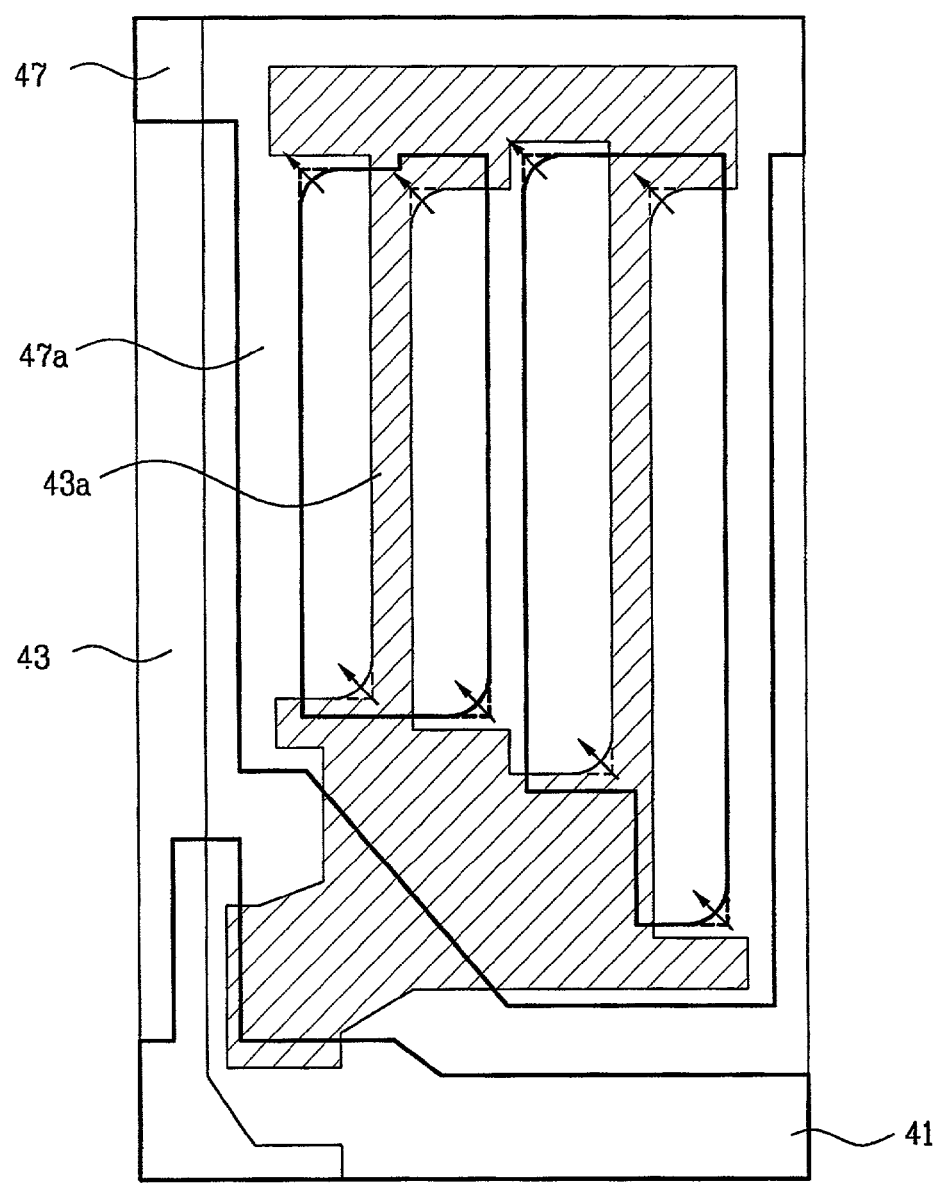
FIG. 13 shows an electric field direction according to a pattern deformation in-the plane switching mode LCD device according to the fifth embodiment of the present invention.

Therefore, as shown in FIG. 13, the electric field between the common electrode 47a and the data electrode 43a is formed in the same direction as the rubbing direction.

The reason why the electric field direction is varied by varying the overlap position between the common electrode 47a and the data electrode 43a will be described as compared with the related art.

Figure 14A:
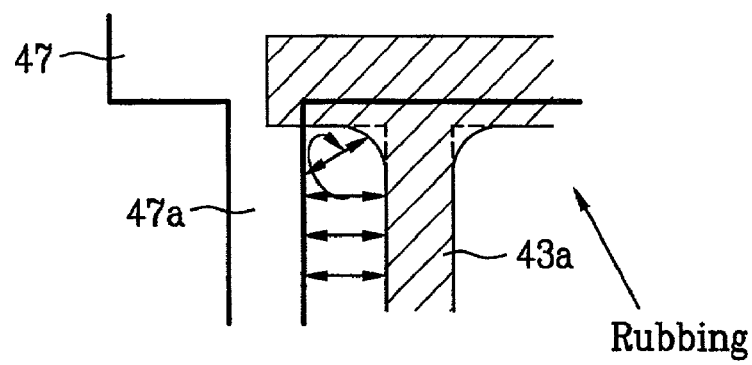
FIGS. 14a and 14b are comparison views between an in-plane switching mode LCD device according to the present invention and the related art in-plane switching mode LCD device.
Figure 14B:
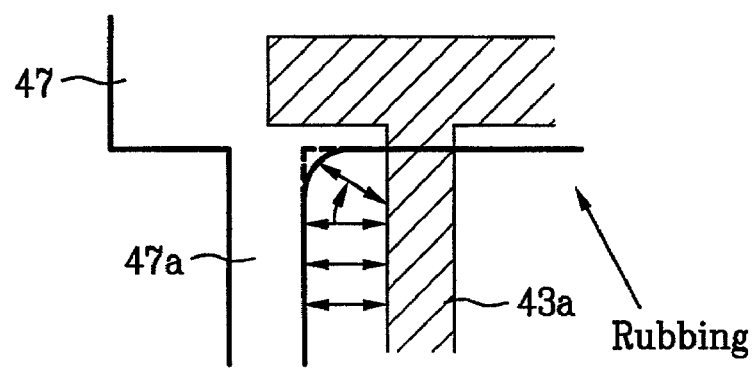
Figure 15:
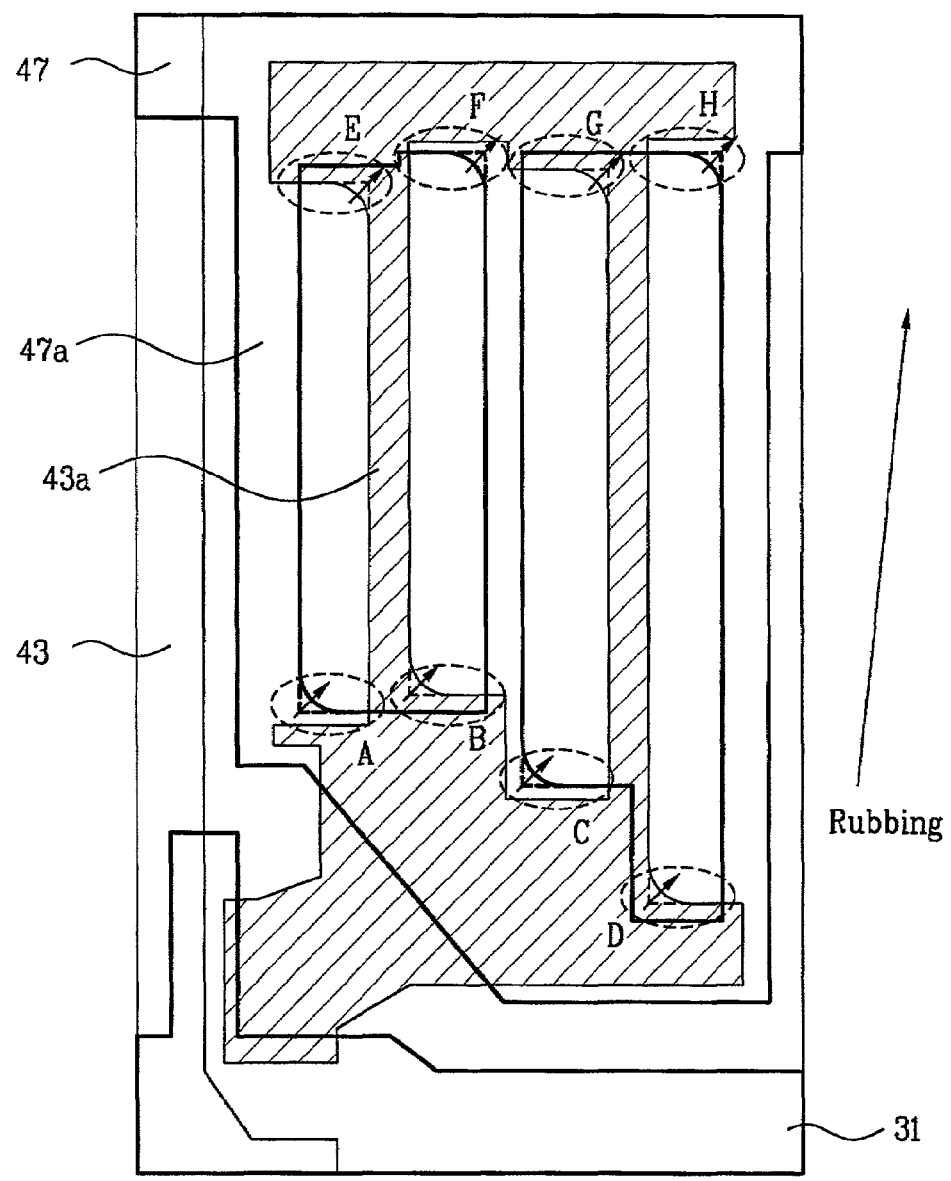
FIG. 15 is a plan view illustrating different rubbing directions in the in-plane switching mode LCD device according to the fifth embodiment of the present invention.

FIG. 14A shows an electric field direction between the common electrode 47a and the data electrode 43a in the related art, and FIG. 14B shows an electric field direction between the common electrode 47a and the data electrode 43a according to the fifth embodiment of the present invention.

As shown in FIG. 14A, in the related art, in which the edge portions of the data electrode are located outside the common line 47, the electric field between the round portion of the data electrode 43a and its adjacent common electrode 47a is formed. Accordingly, direction of the liquid crystal in the round portion is opposite to the rubbing direction along the electric field direction.

By contrast, as shown in FIG. 14B, in the present invention in which the edge portions of the data electrode are located inside the common line 47, the electric field direction is not changed. Accordingly, the direction of the liquid crystal is coincident with the rubbing direction.

As described above, the edge portions of the data electrode 43a that overlaps the common line 47 are selectively formed inside the common electrode 47a (in a portion where the electric field is formed in a direction opposite to the rubbing direction and where the electric field is formed in the same direction as the rubbing direction). Thus, as shown in FIG. 13, the electric field can be formed in the same direction as the rubbing direction in all the edge portions where the data electrode 43a overlaps the common line 47.

In other words, in a state where the patterns are completed, even if edge portions of each pattern have a round shape, the round shape is formed in the same direction as the rubbing direction. Accordingly, the rotation direction of the liquid crystal is in a forward direction relative to the rubbing direction. As a result, no disinclination occurs.

As aforementioned, the in-plane switching mode LCD device according to the present invention has the following advantages.

An overlap type between the common line and the data electrode is varied considering the rubbing direction. In this case, an overlap area is minimized or no overlap area is formed so that overlap between the data electrode and the common line does not affect the electric field. Thus, it is possible to prevent disinclination from occurring without reducing aspect ratio, even if the distance between the common electrode and the data electrode is sufficiently wide. As a result, a wide viewing angle can be obtained and picture quality can be improved.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An in-plane switching mode LCD device comprising:
first and second substrates;
gate and data lines defining a pixel region on the first substrate;
a plurality of common and data electrodes formed to cross one another within the pixel region at constant intervals;
a common line formed in parallel with the gate line, the common electrodes being diverged from the common line;
a thin film transistor formed in a crossing portion of the gate and data lines; and
a liquid crystal layer formed between the first and second substrates,
wherein the data electrodes include a first data electrode having a first end connected with the thin film transistor and a second end overlapping an upper portion of the common line to maintain a direction of an electric field generated between the common electrodes and the data electrodes, and a second data electrode formed between the common electrodes,
wherein the first and second data electrodes each have a substantially rectangular edge portion and a rounded edge portion,
wherein the rectangular edge portion of the first and second data electrodes is located inside the common line, and the round edge portion of the first and second data electrodes is located outside the common line.

2. The in-plane switching mode LCD device of claim 1, wherein the plurality of common electrodes include a first common electrode formed in parallel with the data line and diverged from the common line within the pixel region; a second common electrode formed with at least one data electrode interposed between the first common electrode and the second common electrode in parallel with the first common electrode and diverged from the common line; and a third common electrode formed with at least one data electrode interposed between the second common electrode and the third common electrode, the third common electrode having one end connected with one end of the second common electrode.

3. The in-plane switching mode LCD device of claim 1, wherein the selective inside and outside locations of the edge portions are based upon a rubbing direction.

4. An in-plane switching liquid crystal display device, comprising:
a plurality of parallel data lines;
a plurality of gate lines, crossing the data lines, such that a pixel region is defined by the data and gate lines;
a thin film transistor comprising source, drain and gate electrodes formed at a crossing point of the data and gate lines;
a common line within the pixel region;
a plurality of common electrodes extending in a direction perpendicular to the common line;
a plurality of data electrodes parallel to the common electrodes, wherein first ends of the data electrodes are connected to the drain electrode of said thin film transistor, and second ends of the data electrodes are located on an inner portion of the common line, wherein edges of the data electrodes are rounded and correspond to a rubbing direction, and wherein the data electrodes and the common electrodes form an alternating pattern, wherein the rounded edges of the data electrodes are located outside the common line; and
a transverse data electrode overlying the common line and connecting second ends of the data electrodes, the transverse data electrode having a first portion having a first width and a second portion having a second width, wherein the first width is less than the second width;
wherein the first width is sufficiently narrow that disclination is removed.

5. The in-plane switching liquid crystal display device of claim 4, wherein first ends of the common electrodes intersect the common line,
wherein at least one corner portion of a vertex of each of the intersections of the common electrodes and the common line is rounded, and
wherein at least one corner portion of a vertex of a connecting point of the second ends of the data electrodes and the transverse data electrode are substantially rounded.

6. The in-plane switching liquid crystal display device of claim 5, wherein the first portion of the transverse data electrode converges with the at least one corner portion of the vertex of each of the intersections of the common electrodes and the common line.

7. The in-plane switching liquid crystal display device of claim 6, further comprising a transverse common electrode connected to second ends of the common electrodes, wherein at least one corner portion of a vertex of the intersections of the second ends of the common electrodes and the transverse common electrode are rounded.

8. The in-plane switching liquid crystal display device of claim 7, wherein the second ends of the data electrodes connect to a second transverse data electrode, the second transverse data electrode having a third portion having a third width and a fourth portion having a fourth width, wherein the third width is less than the fourth width.

9. The in-plane switching liquid crystal display device of claim 8, wherein the third portion of the second transverse data electrode converges with the at least one corner portion of the vertex of the intersections of the second ends of the common electrodes and the transverse common electrode.

10. An in-plane switching mode LCD device comprising:
first and second substrates;
gate and data lines defining a pixel region on the first substrate;
a thin film transistor at a crossing portion of the gate and data lines;
a liquid crystal layer between the first and second substrates;
a first common line substantially parallel to the gate line;
at least two common electrodes extending substantially perpendicular to the common line and extending into the pixel region; and
a data electrode with a first portion attached to the thin film transistor and extending substantially parallel to the gate line and with a second portion extending into the pixel area between the common electrodes and substantially perpendicular to the first portion, where the data electrode has first and second corners on either side of the second portion where the first and second portions join;
wherein the first corner overlaps the one of the first common line and common electrode and the second corner is a rounded corner that does not overlap either the first common line or the common electrode.

11. The device of claim 10, further comprising:
a second common line substantially parallel to the gate line that joins the common electrodes at an end distal from the first common line;
wherein the data electrode includes a third portion that extends substantially parallel to the gate line and joins the second portion at an end distal from the first portion;
wherein the data electrode has third and fourth corners on either side of the second portion where the second and third portions join; and
wherein the third corner overlaps one of the second common line and common electrode and the forth corner is a rounded corner that does not overlap either the first common line or the common electrode.

12. The device of claim 10, wherein the location of the second corner depends upon the rubbing direction of an alignment layer.

* * * * *